(12) United States Patent
Daiku

(10) Patent No.: US 7,978,285 B2
(45) Date of Patent: Jul. 12, 2011

(54) SURFACE LIGHT SOURCE WHICH SELECTIVELY IRRADIATES TWO LINEARLY POLARIZED LIGHT BEAMS IN POLARIZED STATES DIFFERENT FROM EACH OTHER AND LIQUID CRYSTAL DISPLAY APPARATUS USING THE SAME

(75) Inventor: Yasuhiro Daiku, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 621 days.

(21) Appl. No.: 12/077,512

(22) Filed: Mar. 19, 2008

(65) Prior Publication Data

US 2008/0231773 A1 Sep. 25, 2008

(30) Foreign Application Priority Data

Mar. 20, 2007 (JP) ................. 2007-073209

(51) Int. Cl.
  *G02F 1/1335* (2006.01)
  *F21V 7/04* (2006.01)
  *G09G 3/36* (2006.01)
  *H01L 29/18* (2006.01)

(52) U.S. Cl. ............. 349/61; 349/62; 349/63; 349/64; 349/65; 349/66; 362/611; 362/612; 362/613; 362/614; 345/87; 257/88

(58) Field of Classification Search .......... 349/62–66; 362/611–614; 345/87; 257/88
See application file for complete search history.

(56) References Cited

U.S. PATENT DOCUMENTS

| | | | | |
|---|---|---|---|---|
| 5,940,149 A | * | 8/1999 | Vanderwerf | 349/5 |
| 6,163,351 A | * | 12/2000 | Nakayama | 349/61 |
| 6,222,689 B1 | * | 4/2001 | Higuchi et al. | 359/837 |
| 6,930,737 B2 | * | 8/2005 | Weindorf et al. | 349/96 |
| 7,755,597 B2 | * | 7/2010 | Naka et al. | 345/102 |

FOREIGN PATENT DOCUMENTS

| | | |
|---|---|---|
| JP | 10-063199 A | 3/1998 |
| JP | 2001-42282 A | 2/2001 |
| JP | 2003-262845 A | 9/2003 |
| JP | 2006-235288 A | 9/2006 |

OTHER PUBLICATIONS

Korean Office Action dated May 29, 2009 and English translation thereof issued in a counterpart Korean Application No. 10-2008-0024732.

* cited by examiner

*Primary Examiner* — Hoan C Nguyen
(74) *Attorney, Agent, or Firm* — Holtz, Holtz, Goodman & Chick, PC

(57) ABSTRACT

A surface light source includes a light source which selectively irradiates two polarized light beams in polarized states different from each other, a light guide plate which includes a transparent plate having two plate surfaces facing each other and end faces surrounding the plate surfaces, and irradiates the two polarized light beams form an irradiation surface, and an optical element which irradiates irradiated light from the irradiation surface of the light guide plate toward a direction substantially normal to the light guide plate upon changing the propagation direction of the irradiated light. A liquid crystal display apparatus includes this surface light source, a polarization control element which is placed on the observation side of the surface light source and rotates the polarization plane of linearly polarized light transmitted through one of partitioned first and second areas through a predetermined angle, and a liquid crystal display device placed on the observation side.

14 Claims, 3 Drawing Sheets

SURFACE LIGHT SOURCE WHICH SELECTIVELY IRRADIATES TWO LINEARLY POLARIZED LIGHT BEAMS IN POLARIZED STATES DIFFERENT FROM EACH OTHER AND LIQUID CRYSTAL DISPLAY APPARATUS USING THE SAME

CROSS-REFERENCE TO RELATED APPLICATIONS

This application is based upon and claims the benefit of priority from prior Japanese Patent Application No. 2007-073209, filed Mar. 20, 2007, the entire contents of which are incorporated herein by reference.

BACKGROUND OF THE INVENTION

1. Field of the Invention

The present invention relates to a surface light source which selectively irradiates light beams in two polarized states different from each other, and a liquid crystal display apparatus using the surface light source.

2. Description of the Related Art

A liquid crystal display apparatus includes a liquid crystal display device and a surface light source. The liquid crystal display device has front and rear polarizing plates respectively placed on the front surface facing the observation side of display and the rear surface on the opposite side to the front surface. The surface light source is placed behind the liquid crystal display device and applies illumination light to the screen area of the liquid crystal display device. The liquid crystal display device is driven by a driving unit which sequentially supplies image data to the pixels of the liquid crystal display device for each frame to display a one-frame image. The liquid crystal display device has a screen area where pixels which control the transmission of light are arrayed in the row and column directions. The liquid crystal display device displays an image corresponding to image data by using the pixels.

The liquid crystal display apparatus uses the hold display mode of holding the display of an image corresponding to image data written in a given frame on a frame basis. For this reason, when displaying a moving image such as a television image, this apparatus gives the observer of the display a feeling of blur, i.e., makes observer see an after image of the displayed image of a preceding frame which is superimposed on the displayed image of the next frame.

As a countermeasure against such blurring of the display of a moving image, there has been known a technique of preventing an after image of the displayed image of a preceding frame from remaining on the next frame by performing black display in the period between a frame for displaying an image corresponding to image data and the next frame for displaying a subsequent image.

As display techniques based the above image display and black display, there have been proposed a technique of alternately displaying an image and black for each frame on the entire screen area of the liquid crystal display device and a technique of partitioning the screen area of the liquid crystal display device into, for example, two areas, and alternately displaying an image and black for each frame on one area while alternately displaying black and an image for each frame on the other area (see Jpn. Pat. Appln. KOKAI Publication No. 2001-42282).

As described above, however, since this technique displays one image by alternately performing image display and black display in two frames, the frame frequency needs to be doubled in order to perform display without causing flicker. However, the liquid crystal does not allow obtaining a sufficient response speed corresponding to the doubled frame frequency.

BRIEF SUMMARY OF THE INVENTION

An object of the present invention is to provide a surface light source which selectively irradiates two light beams in polarized states different from each other and to provide a liquid crystal display apparatus which uses the surface light source and has good display characteristics for moving images.

A surface light source according to a first aspect of the present invention includes a light source which selectively irradiates two polarized light beams in polarized states different from each other, a light guide plate which includes a transparent plate having two plate surfaces facing each other and end faces surrounding the plate surfaces, guides two light beams selectively irradiated from the light source into the transparent plate upon allowing the light to enter from the end face, and irradiates the light from an irradiation surface, which is one of the two plate surfaces, and an optical element which irradiates irradiated light from the irradiation surface of the light guide plate toward a direction nearly normal to the light guide plate upon changing a propagation direction of the irradiated light.

A liquid crystal display apparatus according to a second aspect of the present invention includes a surface light source which selectively applies first illumination light and second illumination light comprising two linearly polarized light beams having polarization planes nearly perpendicular to each other, a polarization control element which is placed on an irradiation surface side, from which illumination light is irradiated, of the surface light source, has an area which corresponds to the irradiation surface of the surface light source and is partitioned into a first area corresponding to a predetermined range and a second area other than the first area, and rotates a polarization plane of linearly polarized light which will be transmitted through one of the partitioned first and second areas by a predetermined angle, and a liquid crystal display device which includes a polarizing plate placed on a light irradiation surface side of the polarization control element so as to correspond to both the first and second areas and has a transmission axis nearly parallel to a polarization plane of linearly polarized light irradiated upon being transmitted through one of the first and second areas of the polarization control element, and displays images on portions corresponding to the first and second areas in synchronism with selective application of the first and second illumination light.

A liquid crystal display apparatus according to a third aspect of the present invention includes a surface light source which selectively applies first illumination light comprising first linearly polarized light having a polarization plane in a predetermined direction and second illumination light comprising linearly polarized light having a polarization plane nearly perpendicular to the polarization plane of the first linearly polarized light, a polarization control element which is placed on a surface side, from which illumination light is irradiated, of the surface light source, has an area which corresponds to an illumination light irradiation surface of the surface light source and is partitioned into a first area corresponding to a predetermined range and a second area other than the first area, and rotates a polarization plane of linearly polarized light which will be transmitted through one of the partitioned first and second areas by a predetermined angle, a liquid crystal display device which has a polarizing plate which is placed on a light irradiation surface side of the polarization control element so as to correspond to both the first and second areas and has a transmission axis nearly parallel to a polarization plane of linearly polarized light irradiated to the irradiation surface side upon being transmitted through one of the first and second areas of the polarization control element, is provided with a screen area in which pixels which control transmission of light are arrayed in row directions and column directions, and displays, in the screen area, an image corresponding to image data supplied to the pixels, and a driving unit which, in one frame for display a one-frame image, causes the surface light source to apply one of the first and second illumination light in a period during which the image data are supplied to pixels on each row corresponding to the first area of the polarization control element, and causes the surface light source to apply the other of the first and second illumination light in a period during which the image data are supplied to pixels on each row corresponding to the second area of the polarization control element.

According to the present invention, a surface light source which irradiates two illumination light beams in different polarized states is obtained, and a liquid crystal display apparatus which has good display characteristics by using the surface light source.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
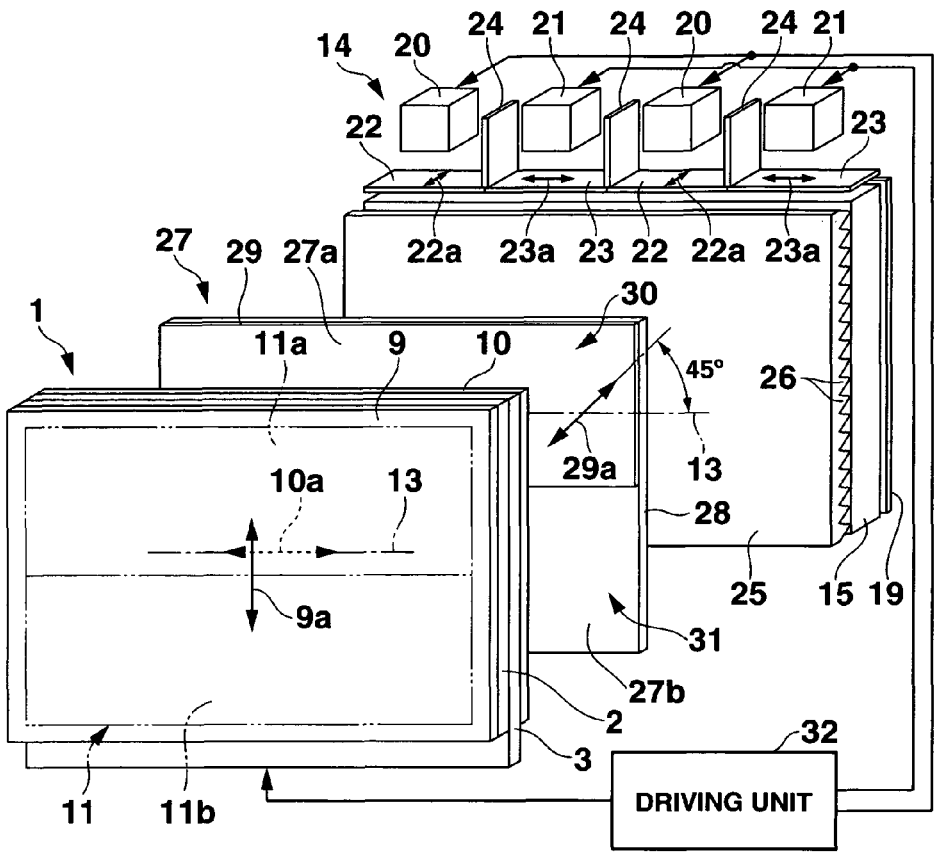
FIG. 1 is a perspective view of a liquid crystal display apparatus according to an embodiment of the present invention.

FIG. 1 is a perspective view of a liquid crystal display apparatus according to an embodiment of the present invention. This liquid crystal display apparatus includes a liquid crystal display device 1, a surface light source 14 placed behind the liquid crystal display device 1, a polarization control element 27 placed between the surface light source 14 and the liquid crystal display device 1, and a driving unit 32 which drives the liquid crystal display device 1 and the surface light source 14. The liquid crystal display device 1 includes a liquid crystal panel, a front polarizing plate 9, and a rear polarizing plate 10. The liquid crystal panel includes a screen area 11 in which pixels 12 (see FIG. 2) which control the transmission of light are arrayed in the row and column directions. The front polarizing plate 9 and the rear polarizing plate 10 are respectively placed on the front surface on the observation side of display and the rear surface on the opposite side to the front surface. This liquid crystal display device displays an image corresponding to image data supplied to the pixels 12.

Figure 2:
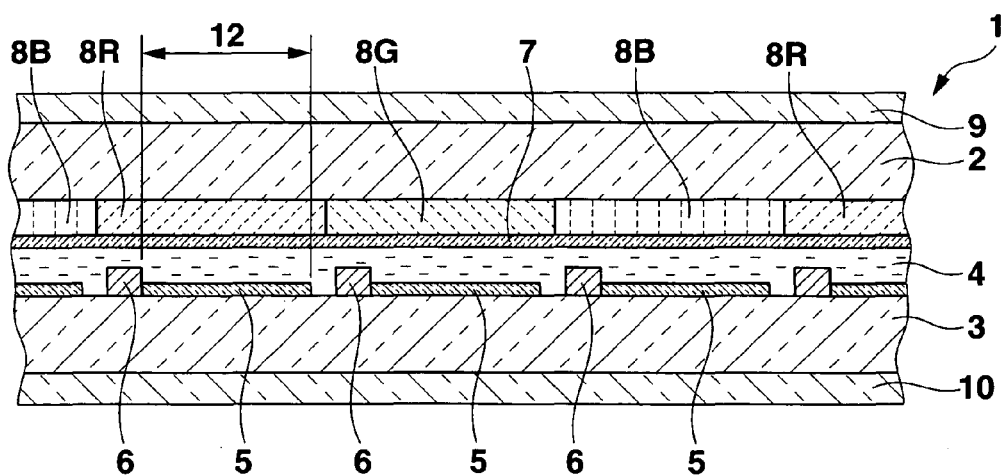
FIG. 2 is a sectional view of part of the liquid crystal display device of the liquid crystal display apparatus.

FIG. 2 is a sectional view of part of the liquid crystal display device 1. The liquid crystal display device 1 is a TN type active matrix liquid crystal display device which includes TFTs (Thin-Film Transistors) 6 as active elements and has twisted/aligned liquid crystal molecules. This liquid crystal display device includes a pair of transparent substrates 2 and 3 placed to face each other through a predetermined gap and a liquid crystal layer 4 sealed in the gap between the transparent substrates 2 and 3. Pixel electrodes 5 arrayed in the row direction (the horizontal direction of the screen) and the column direction (the vertical direction of the screen) are formed on one of the inner surfaces of the pair of transparent substrates 2 and 3 which face each other, e.g., the inner surface of the substrate 3 (to be referred to as the rear substrate hereinafter) on the opposite side to the observation side. The TFTs 6 are respectively connected to the pixel electrodes 5. A transparent opposed electrode 7 in the form of a single film is provided on the inner surface of the other substrate, i.e., the substrate 2 (to be referred to as the front substrate hereinafter) on the observation side. The opposed electrode 7 has areas which respectively face the pixel electrodes 5 to constitute the pixels 12.

FIG. 2 simply shows the TFTs 6 described above. The TFT 6 includes a gate electrode formed on the surface of the rear substrate 3, a transparent gate insulating film formed on almost the entire area on the surface of the rear substrate 3 so as to cover the gate electrodes, i-type semiconductor film formed on the gate insulating film so as to face the gate electrode, and drain and source electrodes formed on n-type semiconductor films on two side portions of the i-type semiconductor film.

Although not shown in FIG. 2, scanning lines to supply gate signals to the TFTs 6 on each row and signal lines to supply data signals to the TFTs 6 on each column are provided on the inner surface of the rear substrate 3. The gate electrodes of the TFTs 6 are connected to the scanning lines. The drain electrodes of the TFTs 6 are connected to the signal lines.

The pixel electrode 5 is formed on the gate insulating film. One end portion of the pixel electrode 5 is connected to the source electrode of the TFT 6.

Red, green, and blue color filters 8R, 8G, and 8B are formed on the inner surface of the front substrate 2 so as to respectively correspond to the pixels 12. The opposed electrode 7 is formed on these filters.

The pair of substrates 2 and 3 are joined to each other via a frame-like seal member (not shown). The liquid crystal layer 4 is sealed in the gap between the substrates 2 and 3 which is surrounded by the seal member.

Although not shown in FIG. 2, aligning films are respectively formed on the inner surfaces of the pair of substrates 2 and 3 so as to cover the electrodes 5 and 7. The aligning direction of the liquid crystal molecules of the liquid crystal layer 4 near the substrates 2 and 3 is defined by the aligning films, and are aligned in a predetermined aligned state between the pair of substrates 2 and 3.

As the liquid crystal display device 1, one of the following devices may be used: a TN or STN type liquid crystal display device in which the liquid crystal molecules of the liquid crystal layer 4 are twisted/aligned; a vertically aligned type liquid crystal display device in which the liquid crystal molecules are aligned nearly vertically to the surfaces of the substrates 2 and 3; a horizontally aligned type liquid crystal display device in which the liquid crystal molecules are aligned nearly parallel to the surfaces of the substrates 2 and 3 without being twisted; a bend-aligned liquid crystal display device in which the liquid crystal molecules are bend-aligned; and a ferroelectric or antiferroelectric liquid crystal display device. In each of these liquid crystal display devices, the front and rear polarizing plates 9 and 10 are respectively bonded to the outer surfaces of the pair of substrates 2 and 3 such that transmission axes 9a and 10a (see FIG. 1) are oriented in predetermined directions.

The liquid crystal display device 1 in this embodiment is configured to change the aligned state of the liquid crystal molecules by generating an electric field between the electrodes 5 and 7 respectively provided on the inner surfaces of the pair of substrates 2 and 3. However, the present invention is not limited to this. For example, a lateral electric field control type device may be used, which has, for example, first and second comb-like electrodes forming pixels provided on one of the inner surfaces of a pair of substrates, and changes the aligned state of liquid crystal molecules by generating a lateral electric field (an electric field in a direction along the substrate surface) between the electrodes.

The surface light source 14 placed behind the liquid crystal display device 1 selectively applies first illumination light and second illumination light respectively comprising two linearly polarized light beams having polarization planes nearly perpendicular to each other. That is, the surface light source 14 selectively applies, to the entire screen area 11 of the liquid crystal display device 1, the first illumination light comprising linearly polarized light having a polarization plane nearly parallel to the transmission axis 10a of the rear polarizing plane 10 of the liquid crystal display device 1 and the second illumination light comprising linearly polarized light having a polarization plane nearly perpendicular to the transmission axis 10a of the rear polarizing plane 10 of the liquid crystal display device 1.

Figure 3:
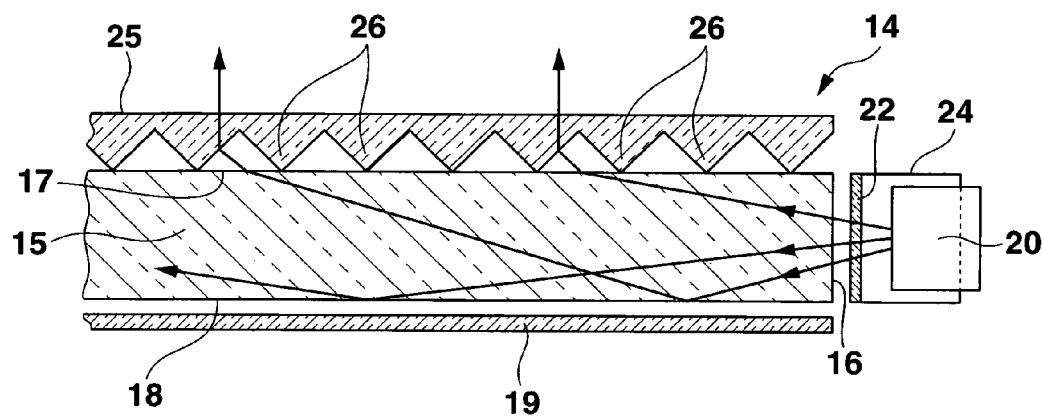
FIG. 3 is a sectional view of part of the surface light source of the liquid crystal display apparatus.

FIG. 3 is a sectional view of part of the surface light source 14. As shown in FIGS. 1 and 3, the surface light source 14 includes a light guide plate 15 comprising a transparent plate having two plate surfaces facing each other and end faces surrounding the plate surfaces, a light source which selectively irradiates two polarized light beams in polarized states different from each other, and an optical element which irradiates the irradiated light in a direction nearly normal to the light guide plate upon changing the propagation direction of the irradiated light. The light guide plate 15 has an irradiation surface 17 corresponding to the liquid crystal display device 1, an incident surface 16 which is formed on at least one end of the irradiation surface 17 to allow light to enter from a direction nearly perpendicular to the normal direction of the irradiation surface 17, and a reflecting surface 18 which reflects the light which has entered from the incident surface 16 toward the liquid crystal display device 1. The light source includes first and second light-emitting elements 20 and 21 and first and second polarizing element 22 and 23. The first and second light-emitting elements 20 and 21 are placed to face the incident surface 16 of the light guide plate 15 and are selectively turned on. The first polarizing element 22 is placed between the first light-emitting element 20 and the incident surface 16 of the light guide plate 15, and has a transmission axis 22a in a direction nearly perpendicular to the irradiation surface 17 of the light guide plate 15. The second polarizing element 23 is placed between the second light-emitting element 21 and the incident surface 16 of the light guide plate 15, and has a transmission axis 23a nearly parallel to the irradiation surface 17 of the light guide plate 15. That is, the light source includes the first polarizing element 22, which has the transmission axis 22a nearly perpendicular to the direction of the transmission axis 10a of the rear polarizing plane 10 of the liquid crystal display device 1 and is placed between the first light-emitting element 20 and the incident surface 16 of the light guide plate 15, and the second polarizing element 23, which has the transmission axis 23a nearly parallel to the direction of the transmission axis 10a of the rear polarizing plane 10 of the liquid crystal display device 1 and is placed between the second light-emitting element 21 and the incident surface 16 of the light guide plate 15.

The light guide plate 15 includes, for example, a rectangular transparent member having an area corresponding to the entire screen area 11 of the liquid crystal display device 1. The incident surface 16 for light is formed on one end face of the light guide plate 15, e.g., an end face corresponding to the upper side of the screen area 11 of the liquid crystal display device 1. The irradiation surface 17 for light which has entered from the incident surface 16 is formed on a plate surface facing the liquid crystal display device 1. The reflecting surface 18 which reflects the light entering from the incident surface 16 toward the liquid crystal display device 1 and irradiates the light from the irradiation surface 17 is formed on a plate surface on the opposite side to the irradiation surface 17.

The reflecting surface 18 of the light guide plate 15 is formed by an inner reflecting surface which totally reflects the light entering from the incident surface 16 at the interface between the reflecting surface 18 and an air layer as outside air. A reflecting plate 19 is placed behind the reflecting surface 18 of the light guide plate 15. The reflecting plate 19 returns, to the light guide plate 15, leakage light, of the light entering from the incident surface 16, which is transmitted through the reflecting surface 18. The reflecting surface 18 and the reflecting plate 19 placed behind the surface 18 constitute a reflecting member.

Each of the first and second light-emitting elements 20 and 21 is a solid-state light-emitting element which comprises an LED (Light-Emitting Diode) and phosphors or fluorescent substance which are respectively excited by irradiated light (e.g., blue light) from the LED to emit yellow, red, and green light beams, and irradiates nearly white light by using these light beams, or a solid-state light-emitting element which comprises LEDs for emitting red, blue, and green light beams and irradiates nearly white light by mixing the light beams of the respective colors. The first and second light-emitting elements 20 and 21 are alternately arranged at equal intervals, by twos or more (twos in FIG. 1), along the longitudinal direction (the widthwise direction of the light guide plate 15) of the incident surface 16 of the light guide plate 15.

The first polarizing element 22 and the second polarizing element 23 each comprise a polarizing plate formed into a rectangular plate having a length obtained by equally dividing the length of the incident surface 16 of the light guide plate 15 by the number of first and second light-emitting elements 20 and 21 arranged and a width almost equal to the width of the incident surface 16 of the light guide plate 15 (the width of the light guide plate 15). The first polarizing element 22 and the second polarizing element 23 are arranged so as to correspond to the first light-emitting element 20 and the second light-emitting element 21, respectively, and so that edges of the adjacent first and second polarizing elements 22 and 23 are adjacent to each other.

In the liquid crystal display device 1 in this embodiment, the front polarizing plate 9 and the rear polarizing plane 10 are arranged so that the transmission axes 9a and 10a are nearly perpendicular to each other, and the transmission axis 10a of the rear polarizing plane 10 is nearly parallel to a horizontal axis 13 of the screen. The first polarizing element 22 corresponding to the first light-emitting element 20 has the transmission axis 22a in a direction perpendicular to the irradiation surface 17 of the light guide plate 15. The second polarizing element 23 corresponding to the second light-emitting element 21 has the transmission axis 23a in a direction parallel to the incident surface 16 of the irradiation surface 17 of the light guide plate 15.

The first light-emitting element 20 and the first polarizing element 22 corresponding thereto constitute a first light source unit. The second light-emitting element 21 and the second polarizing element 23 corresponding thereto constitute a second light source unit. A light-shielding plate 24 is placed between the first and second light source units to partition them.

The surface light source 14 further includes an optical element comprising a prism sheet 25 which is placed to face the irradiation surface 17 of the light guide plate 15 and refracts the light irradiated from the irradiation surface 17 in the normal direction of the liquid crystal display device 1.

The prism sheet 25 has elongated prism portions 26 extending in a direction parallel to the incident surface 16 of the light guide plate 15 which are densely arranged on one entire surface of a transparent sheet. The surface of the prism sheet 25 on which the prism portions 26 are formed faces the irradiation surface 17 of the light guide plate 15.

The surface light source 14 selectively turns on the first light-emitting element 20 and the second light-emitting element 21. When turning on the first light-emitting element 20, the surface light source 14 applies, to the liquid crystal display device 1, linearly polarized light parallel to the transmission axis 22a of the first polarizing element 22 corresponding to the first light-emitting element 20, i.e., the first illumination light comprising linearly polarized light having a polarization plane nearly perpendicular to the transmission axis 10a of the rear polarizing plane 10 of the liquid crystal display device 1. When turning on the second light-emitting element 21, the surface light source 14 applies, to the liquid crystal display device 1, linearly polarized light parallel to the transmission axis 23a of the second polarizing element 23 corresponding to the second light-emitting element 21, i.e., the second illumination light comprising linearly polarized light having a polarization plane nearly parallel to the transmission axis 10a of the rear polarizing plane 10 of the liquid crystal display device 1.

That is, when turning on the first light-emitting element 20, light from the first light-emitting element 20 is formed into linearly polarized light parallel to the transmission axis 22a by the first polarizing element 22 and enters the light guide plate 15 via the incident surface 16. As indicated by the arrows in FIG. 3, this linearly polarized light is reflected by the reflecting surface 18 of the light guide plate 15 and irradiated from the entire irradiation surface 17 of the light guide plate 15.

In addition, when turning on the second light-emitting element 21, light from the second light-emitting element 21 is formed into linearly polarized light parallel to the transmission axis 23a by the second polarizing element 23 and enters the light guide plate 15 via the incident surface 16. This linearly polarized light is internally reflected by the reflecting surface 18 of the light guide plate 15 and irradiated from the entire irradiation surface 17 of the light guide plate 15.

The light irradiated from the irradiation surface 17 of the light guide plate 15 is refracted by the prism sheet 25 in the normal direction of the liquid crystal display device 1 and applied to the entire screen area 11 of the liquid crystal display device 1.

As described above, the surface light source 14 includes the light guide plate 15, the first and second light-emitting elements 20 and 21, the first polarizing element 22, the second polarizing element 23, and the optical element. The light guide plate 15 comprises the plate-like transparent member having the two plate surfaces facing each other and the end faces surrounding the plate surfaces. The incident surface 16 which light strikes is formed on the end face of the transparent member. The irradiation surface 17 for light entering from the incident surface 16 is formed one plate surface. The reflecting surface 18 which reflects light entering from the incident surface 16 to the irradiation surface 17 is formed on the other plate surface on the opposite side. The first and second light-emitting elements 20 and 21 are placed to face the incident surface 16 of the light guide plate 15 and are selectively turned on. The first polarizing element 22 has the transmission axis 22a nearly perpendicular to the irradiation surface 17 of the light guide plate 15, and is placed between the first light-emitting element 20 and the incident surface 16 of the light guide plate 15. The second polarizing element 23 has the transmission axis 23a nearly parallel to the irradiation surface 17 of the light guide plate 15 and is placed between the second light-emitting element 21 and the incident surface 16 of the light guide plate 15. The optical element causes irradiated light to be irradiated in a direction nearly normal to the irradiation surface 17 of the light guide plate 15 upon changing the propagation direction of the light. With this arrangement, selectively turning on the first and second light-emitting elements 20 and 21 makes it possible to selectively apply illumination light beams in polarized states different from each other, which comprise the first illumination light which is linearly polarized light having a polarization plane in a direction nearly perpendicular to the irradiation surface 17 of the light guide plate 15 and the second illumination light which is linearly polarized light having a polarization plane nearly parallel to the irradiation surface 17 of the light guide plate 15.

The surface light source 14 further includes the light-shielding plate 24 which partitions the first light source unit including the first light-emitting element 20 and the first polarizing element 22 corresponding thereto from the second light source unit including the second light-emitting element 21 and the second polarizing element 23 corresponding thereto. This prevents irradiated light from the first light-emitting element 20 and irradiated light from the second light-emitting element 21 from striking both the adjacent first and second polarizing elements 22 and 23. Therefore, when turning on the first light-emitting element 20, the surface light source 14 can irradiate only the first illumination light linearly polarized by the first polarizing element 22. When turning on the second light-emitting element 21, the surface light source 14 can irradiate only the second illumination light linearly polarized by the second polarizing element 23.

The surface light source 14 further includes the optical element comprising the prism sheet 25 which refracts the light irradiated from the irradiation surface 17 of the light guide plate 15 in the normal direction of the liquid crystal display device 1. This can apply illumination light with an intensity distribution having a peak equal to the irradiated light intensity from the entire surface of the surface light source 14 in the normal direction.

The liquid crystal display apparatus using the surface light source 14 includes the polarization control element 27 and the liquid crystal display device 1. The polarization control element 27 is placed on the irradiation surface side from which illumination light from the surface light source 14 is irradiated and has an area corresponding to the irradiation surface of the surface light source 14, which is partitioned into a first area 27a corresponding to a predetermined range and a second area 27b other than the first area 27a. The polarization plane of linearly polarized light which is transmitted through one of the partitioned first and second areas 27a and 27b is rotated by a predetermined angle by the polarization control element 27. The liquid crystal display device 1 includes the polarizing plate 10 which is placed on the light irradiation surface side of the polarization control element 27 to correspond to both the first and second areas and has the transmission axis 10a nearly parallel to the polarization plane of linearly polarized light which is irradiated to the irradiation surface side of the polarization control element 27 upon being transmitted through one of the first and second areas 27a and 27b of the polarization control element 27. The liquid crystal display device 1 displays images on portions corresponding to the first and second areas in synchronism with the selective application of the first and second illumination light beams.

That is, the area of the polarization control element 27 which corresponds to the irradiation surface of the surface light source is partitioned into the first area 27a corresponding to the predetermined range and the second area 27b other than the first area 27a. In this embodiment, the area of the polarization control element 27 is partitioned into the first and second areas 27a and 27b respectively corresponding to first and second screen areas 11a and 11b obtained by partitioning the screen area 11 of the liquid crystal display device 1 at the middle position in the scanning direction of each row such that the respective partitioned areas have nearly the same number of rows. The polarization control element 27 has an optical characteristic that rotates the polarization plane of linearly polarized light propagating to one of the two areas 27a and 27b by substantially 90°.

The polarization control element 27 has, in one of the two areas 27a and 27b, a λ/2 retardation film 29 which has a slow axis 29a in an angular direction of nearly 45° (nearly 45° with respect to the horizontal axis 13 of the screen of the liquid crystal display device 1) with respect to the polarization planes of the first and second illumination light beams from the surface light source 14, and gives a phase difference of ½ wavelength between ordinary ray and extraordinary ray of transmitted light.

The polarization control element 27 in this embodiment comprises an optical film obtained by forming the λ/2 retardation film 29 on a portion, of an optically isotropic transparent film 28 corresponding to the entire screen area 11 of the liquid crystal display device 1, which corresponds to one of the first and second areas 27a and 27b, e.g., the first area 27a on the upper half portion of FIG. 1.

That is, the polarization control element 27 includes a polarization control portion 30 and a non-polarization control portion 31. The polarization control portion 30 is formed in a portion corresponding to the first area 27a and has the polarization control film (λ/2 retardation film) 29 which rotates the polarization plane of linearly polarized light by substantially 90°. The non-polarization control portion 31 is formed in a portion corresponding to the second area 27b and comprises only the transparent film 28.

The liquid crystal display device 1 and the surface light source 14 each are driven by the driving unit 32. The driving unit 32 causes the surface light source 14 to apply one of the first and second illumination light beams in a period, in one frame for displaying a one-frame image, during which the image data are supplied to the pixels on each row corresponding to the first area 27a of the polarization control element 27. The driving unit 32 causes the surface light source 14 to apply the other of the first and second illumination light beams in a period, in the above frame, during which the image data are supplied to the pixels on each row corresponding to the second area 27b of the polarization control element 27. That is, the driving unit includes a display driving circuit which sequentially selects the pixels 12 on rows of the liquid crystal display device 1 for each row, supplies gate signals to the scanning lines of each selected row, and supplies data signals to the signal line on each row selection period, and a light source driving circuit which selectively turns on the first light-emitting elements 20 and second light-emitting elements 21 of the surface light source 14.

The display driving circuit of the driving unit 32 sequentially supplies image data to the pixels 12 in the entire screen area corresponding to the first and second areas 27a and 27b for each row by supplying, for each frame for displaying a one-frame image, a gate signal to the scanning line on each selected row of the liquid crystal display device 1, and data signal to signal lines. The light source driving circuit turns on one of the first and second light-emitting elements 20 and 21 to cause the surface light source 14 to apply one of the first and second illumination light beams in a first period T1. The first period T1 is the first half of a period T during which image data are supplied to the entire screen area and is a period for supplying the image data to the pixels 12 on each row corresponding to the first area 27a. The light source driving circuit turns on the other of the first and second light-emitting elements 20 and 21 to cause the surface light source 14 to apply the other of the first and second illumination light beams in a second period T2. The second period T2 is the second half of the period during which image data are written in the entire screen area and is a period for supplying the image data to the pixels 12 on each row corresponding to the second area 27b.

Figure 4:
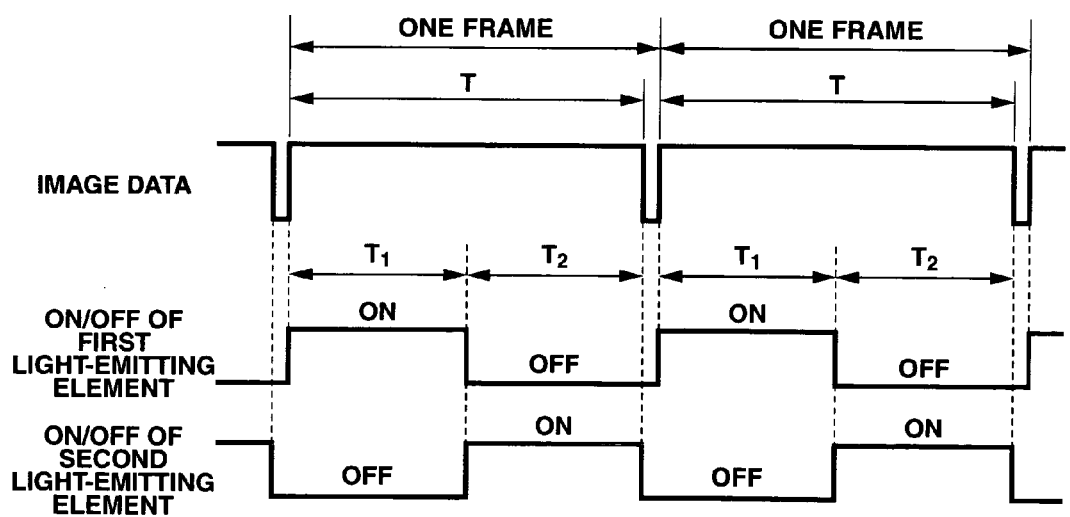
FIG. 4 is a drive sequence chart for the liquid crystal display device and surface light source of the liquid crystal display apparatus.

FIG. 4 is a drive sequence chart for the liquid crystal display device 1 and the surface light source 14 driven by the driving unit 32. In this embodiment, image data are sequentially supplied to the pixels 12 in the entire screen area of the liquid crystal display device 1 for each row and each frame set to, for example, 16.7 ms. The driving unit 32 turns on the first light-emitting element 20 and turns off the second light-emitting element 21 in a first half period of T/2 of the period T, i.e., the first period T1 during which image data are supplied to the pixels 12 on each row corresponding to the first area 27a. This causes the surface light source 14 to apply, to the liquid crystal display device 1, the first illumination light comprising linearly polarized light having a polarization plane nearly perpendicular to the transmission axis 10a of the rear polarizing plane 10 of the liquid crystal display device 1. The driving unit 32 turns off the first light-emitting element 20 and turns on the second light-emitting element 21 in a second half period of T/2 of the period T, i.e., the second period T2 during which image data are supplied to the pixels 12 on each row corresponding to the second area 27b. This causes the surface light source 14 to apply, to the liquid crystal display device 1, the second illumination light comprising linearly polarized light having a polarization plane nearly parallel to the transmission axis 10a of the rear polarizing plane 10 of the liquid crystal display device 1.

This liquid crystal display apparatus includes the surface light source 14, the polarization control element 27, the liquid crystal display device 1, and the driving unit 32. The surface light source 14 selectively applies the first illumination light comprising the first linearly polarized light having a polarization plane in a predetermined direction and the second illumination light comprising linearly polarized light having a polarization plane nearly perpendicular to the polarization plane of the first linearly polarized light. The polarization control element 27 is placed on the surface side of the surface light source 14 from which illumination light is irradiated. The area of the polarization control element 27 which corresponds to the irradiation surface of the surface light source 14 from which illumination light is irradiated is partitioned into the first area 27a corresponding to the predetermined range and the second area 27b other than the first area. The polarization plane of linearly polarized light which is transmitted through one of the first and second areas 27a and 27b is rotated by a predetermined angle by the polarization control element 27. The liquid crystal display device 1 has the polarizing plane 10 which is placed on the light irradiation surface side of the polarization control element 27 to correspond to both the first and second areas 11a and 11b, and has a transmission axis nearly parallel to the polarization plane of the linearly polarized light which is transmitted through one of the first and second areas 27a and 27b of the polarization control element 27 and irradiated to the irradiation surface side. The liquid crystal display device 1 includes the screen area 11 on which pixels for controlling the transmission of light are arrayed in the row and column directions, and supplies image data to the pixels 12 to display an image corresponding to the image data on the screen area 11. In one frame for display a one-frame image, the driving unit 32 causes the surface light source 14 to apply one of the first and second illumination light beams in the period T1 during which the pixel data are supplied to the pixels on each row corresponding to the first area 27a of the polarization control element 27, and causes the surface light source 14 to apply the other of the first and second illumination light beams in the period T2 during which the image data are supplied to the pixels 12 on each row corresponding to the second area 27b of the polarization control element 27. With this arrangement, the liquid crystal display apparatus can sufficiently cope with the responsiveness of the liquid crystal and display a high-quality image by reducing an after image of a displayed image in a preceding frame.

Figure 5:
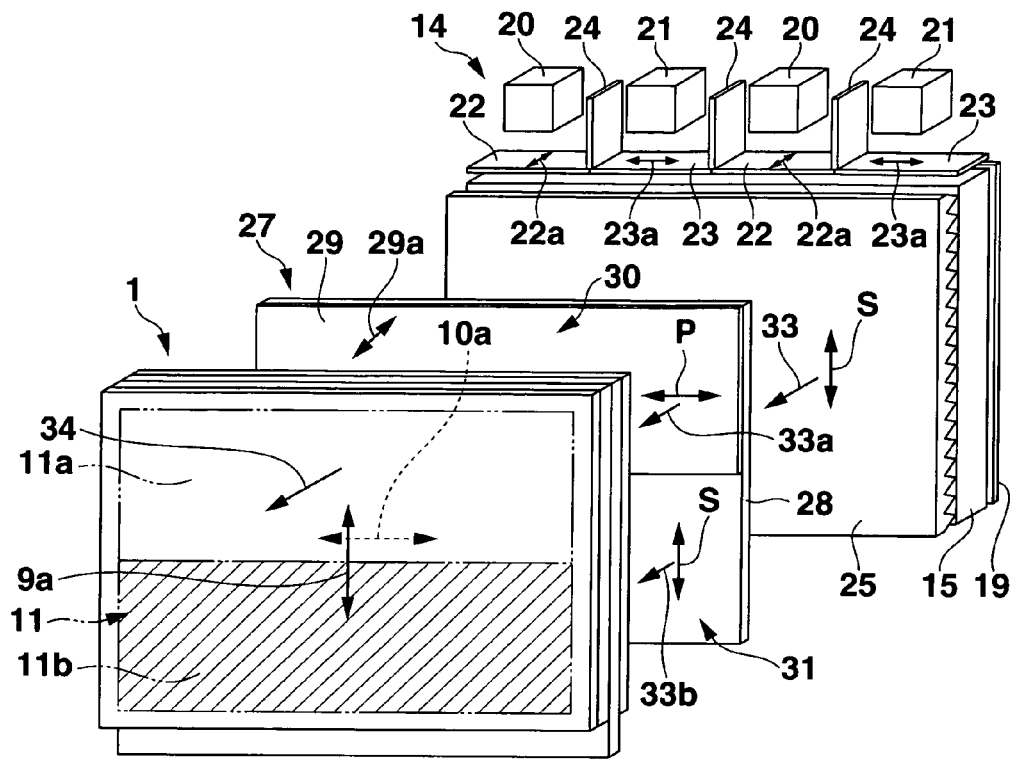
FIG. 5 is a view showing the display state of the liquid crystal display device in a period during which image data are supplied to the pixels on each row in the first screen area of the liquid crystal display device.
Figure 6:
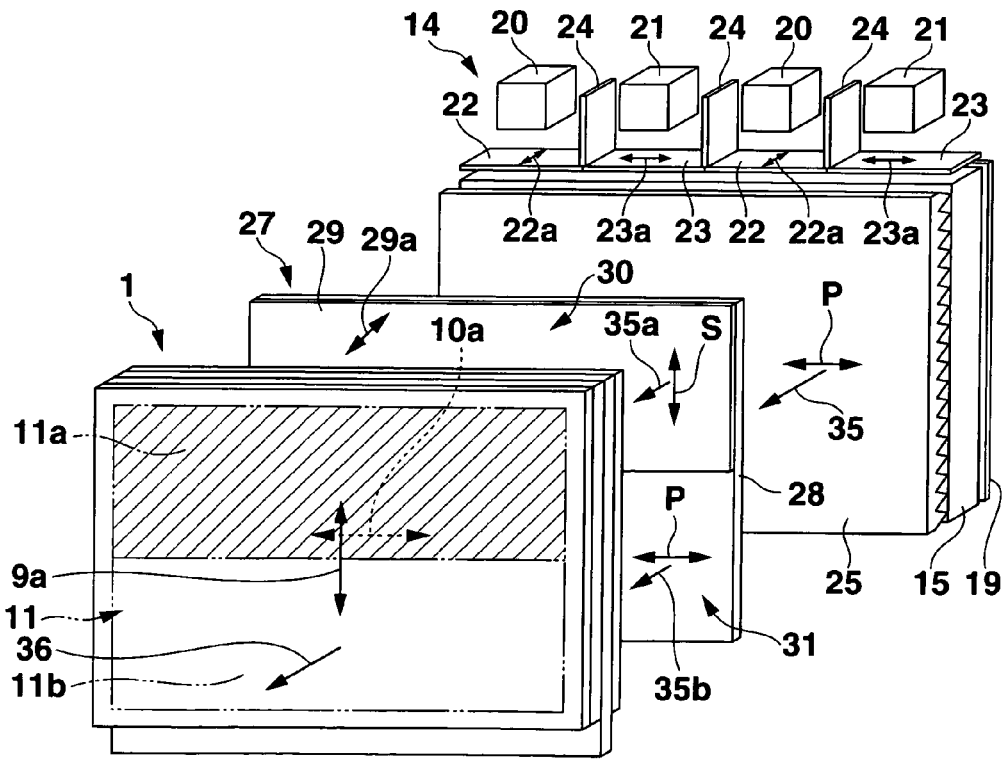
FIG. 6 is a view showing the display state of the liquid crystal display device in a period during which image data are written in the pixels on each row in the second screen area of the liquid crystal display device.

That is, FIG. 5 shows the display state of the liquid crystal display device 1 in the first period T1 during which image data are written in the pixels 12 on each row corresponding to the first area 27a of the liquid crystal display device 1. FIG. 6 shows the display state of the liquid crystal display device 1 in the second period T2 during which image data are written in the pixels 12 on each row corresponding to the second area 27b of the liquid crystal display device 1.

As shown in FIG. 5, in the first period T1 during which image data are supplied to the pixels 12 on each row in the first area 27a of the liquid crystal display device 1, the first light-emitting element 20 is turned on to make the surface light source 14 irradiate linearly polarized light parallel to the transmission axis 22a of the first polarizing element 22 placed between the first light-emitting element 20 and the incident surface 16 of the light guide plate 15. That is, first illumination light 33 comprising linearly polarized light S having a polarization plane nearly perpendicular to the transmission axis 10a of the rear polarizing plane 10 of the liquid crystal display device 1 is applied to the entire screen area 11 of the liquid crystal display device 1.

The polarization plane of light, of the first illumination light 33, which propagates to the first area 27a is rotated by substantially 90° by the polarization control portion 30 including the λ/2 retardation film 29 formed on the portion corresponding to the first area 27a of the polarization control element 27. Illumination light 33a which is transmitted through the polarization control portion 30 becomes linearly polarized light P nearly parallel to the transmission axis 10a of the rear polarizing plane 10 of the liquid crystal display device 1. The illumination light 33a is transmitted through the rear polarizing plane 10 and enters the screen area 11a corresponding to the first area 27a of the liquid crystal display device 1.

On the other hand, light, of the first illumination light 33, which propagates toward the second area 27b is transmitted through the non-polarization control portion 31 corresponding to the second area 27b of the polarization control element 27 without being changed in polarized state. The rear polarizing plane 10 absorbs illumination light 33b which has been transmitted through the non-polarization control portion 31 and has become linearly polarized light S nearly perpendicular to the transmission axis 10a of the rear polarizing plane 10 of the liquid crystal display device 1.

Therefore, in the first period T1 during which image data are written in the pixels 12 on each row in the screen area 11a of the liquid crystal display device 1 which corresponds to the first area 27a, light 34 transmitted through the pixels 12 on each row in the screen area 11a is irradiated, to the observation side, from the first screen area 11a, of the screen area 11 of the liquid crystal display device 1, which the illumination light 33a has entered. With this irradiated light, an image corresponding to the upper half of one frame is displayed in the first screen area 11a. At this time, black display is performed in the entire second screen area 11b which no illumination light enters.

As shown in FIG. 6, the second light-emitting elements 21 are turned on in the second period T2 during which image data are written in the pixels 12 on each row in the second screen area 11b of the liquid crystal display device 1 which corresponds to the second area 27b. With this operation, the surface light source 14 applies second illumination light 35 comprising linearly polarized light parallel to the transmission axis 23a of the second polarizing element 23 placed between the second light-emitting element 21 and the incident surface 16 of the light guide plate 15. That is, the surface light source 14 irradiates, toward the entire screen area 11 of the liquid crystal display device 1, the second illumination light 35 comprising the linearly polarized light P having a polarization plane nearly parallel to the transmission axis 10a of the rear polarizing plane 10 of the liquid crystal display device 1.

The polarization plane of light, of the second illumination light 35, which propagates to the first screen area 11a of the liquid crystal display device 1 is rotated by substantially 90° by the polarization control portion 30 including the λ/2 retardation film 29 formed on the portion corresponding to the first screen area 11a of the polarization control element 27. As a result, the light propagating to the first screen area 11a becomes the linearly polarized light S nearly perpendicular to the transmission axis 10a of the rear polarizing plane 10 of the liquid crystal display device 1, and illumination light 35a is absorbed by the rear polarizing plane 10 of the liquid crystal display device 1.

On the other hand, light, of the second illumination light 35, which propagates toward the second screen area 11b of the screen area 11 of the liquid crystal display device 1 is transmitted through the non-polarization control portion 31 corresponding to the second area 27b of the polarization control element 27 without being changed in polarized state. For this reason, this light, i.e., illumination light 35b comprising the polarized light P nearly parallel to the transmission axis 10a of the rear polarizing plane 10 of the liquid crystal display device 1 is transmitted through the rear polarizing plane 10 and enters the second screen area 11b of the liquid crystal display device 1.

Light 36 which is transmitted through the pixels 12 on each row in the second screen area 11b is therefore irradiated, to the observation window side, from the second screen area 11b, of the screen area 11 of the liquid crystal display device 1, which the illumination light 35b has entered, in the second period T2 during which image data are supplied to the pixels 12 on each row in the second screen area 11b of the liquid crystal display device 1. With the light 36, an image corresponding to the lower half of one frame is displayed in the second screen area 11b. At this time, black display is performed in the entire first screen area 11a which no illumination light enters.

In this manner, this liquid crystal display apparatus alternately performs, for each frame, image display and black display in the first screen area 11a of the upper half of the screen area 11 of the liquid crystal display device 1, and alternately performs black display and image display in the second screen area 11b of the lower half of the screen area 11. This makes it possible to display a high-quality moving image by preventing after images of images displayed in the first half period and second half period of one frame in the screen area 11a and the second screen area 11b from being superimposed on the image display of the next frame and observed.

In addition, this liquid crystal display apparatus sequentially supplies image data to the pixels on rows of the liquid crystal display device 1 for each frame. An image corresponding to the upper half of one frame is displayed in the first screen area 11a by making the illumination light 33a enter the first screen area 11a of the liquid crystal display device 1 in the first period T1 during which image data are supplied to the pixels 12 on each row in the first screen area 11a of the liquid crystal display device 1. Subsequently, an image corresponding to the lower half of one frame is displayed in the second screen area 11b by making the illumination light 35b enter the second screen area 11b of the liquid crystal display device 1 in the second period T2 during which image data are supplied to the pixels 12 on each row in the second screen area 11b of the liquid crystal display device 1. This prevents flicker in display by shortening the time during which display is performed in the first screen area 11a and second screen area 11b of the liquid crystal display device 1.

In addition, this liquid crystal display apparatus includes an optical film as the polarization control element 27. This film is obtained by forming a polarization control film including the $\lambda/2$ retardation film 29, which rotates the polarization plane of transmitted light without attenuating its light intensity, on a portion corresponding to the first screen area 11a of the transparent film 28 which corresponds to the entire screen area 11 of the liquid crystal display device 1. With this arrangement, no difference occurs between the intensity of the illumination light beams 33a and 35a of the first and second illumination light beams 33 and 35 applied from the surface light source 14 and the intensity of the light beams 33b and 35b. The illumination light beams 33a and 35a are those which are transmitted through the polarization control portion 30 on which the $\lambda/2$ retardation film 29 of the polarization control element 27 is formed. The light beams 33b and 35b are those applied from the surface light source 14 and transmitted through the non-polarization control portion 31 including the transparent film 28 of the polarization control element 27. This can display a high-quality image without any luminance irregularity by making the luminances of displayed images in the first screen area 11a and the second screen area 11b uniform.

In the liquid crystal display apparatus of the above embodiment, the polarization plane of illumination light propagating to the first screen area 11a of the liquid crystal display device 1 is rotated by substantially 90° by the polarization control element 27. In contrast to this, in the present invention, the polarization plane of illumination light propagating to the second screen area 11b of the liquid crystal display device 1 can be rotated by substantially 90°. In this case, the polarization control portion 30 of the polarization control element 27, which has the $\lambda/2$ retardation film 29, is placed to correspond to the second screen area 11b of the liquid crystal display device 1. With this arrangement, the surface light source 14 applies, to the liquid crystal display device 1, the second illumination light 35 comprising linearly polarized light having a polarization plane nearly parallel to the transmission axis 10a of the rear polarizing plane 10 of the liquid crystal display device 1 in the period T during which image data are supplied to the pixels 12 on each row in the first screen area 11a of the liquid crystal display device 1. The surface light source 14 applies, to the liquid crystal display device 1, the first illumination light 33 comprising linearly polarized light having a polarization plane nearly perpendicular to the transmission axis 10a of the rear polarizing plane 10 of the liquid crystal display device 1 in a period during which image data are supplied to the pixels 12 on each row in the second screen area 11b of the liquid crystal display device 1.

The polarization control film 29 of the polarization control element 27 is not limited to a $\lambda/2$ retardation film, and may be, for example, a liquid crystal polymer film having liquid crystal molecules aligned in an angular direction of 45° with respect to the polarization planes of the first and second illumination light beams 33 and 35 from the surface light source 14 as long as the film has an optical characteristic that rotates the polarization plane of linearly polarized light by substantially 90°.

In addition, as the polarization control element 27, an element comprising only a polarization control film such as a $\lambda/2$ retardation film or a liquid crystal polymer film can be placed to correspond to one of the first and second screen areas 11a and 11b of the liquid crystal display device 1.

Furthermore, the light guide plate 15 of the surface light source 14 is not limited to that described above. For example, in the above embodiment, a light guide space can be formed between the reflecting plate 19 placed behind the light guide plate 15 and the prism sheet 25, and at least one end of the light guide space is used as an incident portion for allowing light to enter from a direction nearly perpendicular to the normal direction of the liquid crystal display device 1. With this arrangement, the reflecting surface comprising the reflecting plate 19 reflects light entering the light guide space from the incident portion toward the liquid crystal display device 1.

Moreover, the surface light source 14 may have another arrangement as long as it selectively applies, to the entire screen area 11 of the liquid crystal display device 1, the first illumination light which comprises linearly polarized light having a polarization plane nearly perpendicular to the transmission axis 10a of the rear polarizing plane 10 of the liquid crystal display device 1, and the second illumination light which comprises linearly polarized light having a polarization plane nearly parallel to the transmission axis 10a of the rear polarizing plane 10 of the liquid crystal display device 1.

As described above, a surface light source according to the present invention includes a light source which selectively irradiates two polarized light beams in polarized states different from each other, a light guide plate which comprises a transparent plate having two plate surfaces facing each other and end faces surrounding the plate surfaces, guides two light beams selectively irradiated from the light source into the transparent plate upon allowing the light to enter from the end face, and irradiates the light from an irradiation surface, which is one of the two plate surfaces, and an optical element which irradiates irradiated light from the irradiation surface of the light guide plate toward a direction nearly normal to the light guide plate upon changing a propagation direction of the irradiated light.

In the surface light source, preferably, the light source includes a first light-emitting element and a second light-emitting element which are placed on an end face of the light guide plate so as to face each other, a first polarizing element which is placed between the first light-emitting element and the end face of the light guide plate and has a transmission axis in a direction nearly perpendicular to the irradiation surface of the light guide plate, and a second polarizing element which is placed between the second light-emitting element and the end face of the light guide plate and has a transmission axis in a direction nearly parallel to the irradiation surface of the light guide plate. Preferably, the light source comprises a first light source unit including the first light-emitting element and the first polarizing element and a second light source unit including the second light-emitting element and the second polarizing element are placed on one end face of the light guide plate so as to face each other. In this case, desirably, the surface light source further includes a light-shielding plate between the first light source unit and the second light source unit which are alternately arranged on the end face of the light guide plate.

In the surface light source according to the present invention, preferably, the light guide plate includes a reflecting member on the other plate surface side, of the plate surfaces facing each other, which faces the other irradiation surface. Preferably, the optical element comprises a prism sheet in a shape having densely arranged elongated minute prisms extending in a direction nearly parallel to the end face of the light guide plate on which the light source is placed.

A liquid crystal display apparatus according to the present invention includes a surface light source which selectively applies first illumination light and second illumination light comprising two linearly polarized light beams having polarization planes nearly perpendicular to each other, a polarization control element which is placed on an irradiation surface side, from which illumination light is irradiated, of the surface light source, has an area which corresponds to the irradiation surface of the surface light source and is partitioned into a first area corresponding to a predetermined range and a second area other than the first area, and rotates a polarization plane of linearly polarized light which will be transmitted through one of the partitioned first and second areas by a predetermined angle, and a liquid crystal display device which includes a polarizing plate placed on a light irradiation surface side of the polarization control element so as to correspond to both the first and second areas and has a transmission axis nearly parallel to a polarization plane of linearly polarized light irradiated upon being transmitted through one of the first and second areas of the polarization control element, and displays images on portions corresponding to the first and second areas in synchronism with selective application of the first and second illumination light.

In the liquid crystal display apparatus, preferably, the surface light source includes two light source units which selectively irradiate two polarized light beams in polarized states different from each other, a light guide plate which comprises a transparent plate having two plate surfaces facing each other and end faces surrounding the plate surfaces, guides two light beams selectively irradiated from the light source units into the transparent plate upon allowing the light to enter from the end face, and irradiates the light from an irradiation surface, which is one of the two plate surfaces, and an optical element which irradiates irradiated light from the irradiation surface of the light guide plate toward a direction nearly normal to the light guide plate upon changing a propagation direction of the irradiated light. Preferably, the polarization control element comprises a retardation film which is placed in an area corresponding to one of the first and second areas and rotates a polarization plane of one of the first and second illumination light comprising linearly polarized light irradiated from the surface light source. In this case, desirably, the retardation film comprises a $\lambda/2$ retardation film with a slow axis being placed in a direction intersecting the polarization planes of the first and second illumination light at an angle of nearly 45°.

In the liquid crystal display apparatus according to the present invention, preferably, the polarization control element includes a transparent film having a size corresponding to a light irradiation surface of the surface light source and a polarization control film which is placed on a portion, corresponding to one of the first and second areas, of the transparent film and rotates a polarization plane of one of the first and second illumination light comprising linearly polarized light by substantially 90°.

A liquid crystal display apparatus according to the present invention includes a surface light source which selectively applies first illumination light comprising first linearly polarized light having a polarization plane in a predetermined direction and second illumination light comprising linearly polarized light having a polarization plane nearly perpendicular to the polarization plane of the first linearly polarized light, a polarization control element which is placed on a surface side, from which illumination light is irradiated, of the surface light source, has an area which corresponds to an illumination light irradiation surface of the surface light source and is partitioned into a first area corresponding to a predetermined range and a second area other than the first area, and rotates a polarization plane of linearly polarized light which will be transmitted through one of the partitioned first and second areas by a predetermined angle, a liquid crystal display device which has a polarizing plate which is placed on a light irradiation surface side of the polarization control element so as to correspond to both the first and second areas and has a transmission axis nearly parallel to a polarization plane of linearly polarized light irradiated to the irradiation surface side upon being transmitted through one of the first and second areas of the polarization control element, is provided with a screen area in which pixels which control transmission of light are arrayed in row directions and column directions, and supplies image data to the pixels to display an image corresponding to the image data in the screen area, and a driving unit which, in one frame for display a one-frame image, causes the surface light source to apply one of the first and second illumination light in a period during which the image data are supplied to pixels on each row corresponding to the first area of the polarization control element, and causes the surface light source to apply the other of the first and second illumination light in a period during which the image data are supplied to pixels on each row corresponding to the second area of the polarization control element.

In this liquid crystal display apparatus, preferably, the surface light source includes a first light-emitting element and a second light-emitting element which are arranged on an end face of the light guide plate so as to face each other, a first polarizing element which is placed between the first light-emitting element and the end face of the light guide plate and has a transmission axis in a direction nearly perpendicular to the irradiation surface of the light guide plate, a second polarizing element which is placed between the second light-emitting element and the end face of the light guide plate and has a transmission axis in a direction nearly parallel to the irradiation surface of the light guide plate, a light guide plate which comprises a transparent plate having two plate surfaces facing each other and end faces surrounding the plate surfaces, guides two light beams selectively irradiated from the light-emitting elements into the transparent plate upon allowing the light to enter from the end face, and irradiates the light from an irradiation surface, which is one of the two plate surfaces, and an optical element which irradiates irradiated light from the irradiation surface of the light guide plate toward a direction nearly normal to the light guide plate upon changing a propagation direction of the irradiated light. In this case, desirably, a first light source unit including the first light-emitting element and the first polarizing element and a second light source unit including the second light-emitting element and the second polarizing element are placed on one end face of the light guide plate so as to face each other.

In the liquid crystal display apparatus according to the present invention, preferably, the polarization control element comprises a λ/2 retardation film which is placed in an area corresponding to one of the first and second areas and rotates a polarization plane of one of the first and second illumination light comprising linearly polarized light irradiated from the surface light source. In this case, desirably, the λ/2 retardation film is placed so that a slow axis to be in a direction intersecting the polarization planes of the first and second illumination light from the surface light source at an angle of nearly 45°.

In the liquid crystal display apparatus according to the present invention, preferably, the polarization control element is partitioned into a first area corresponding to pixel rows of the liquid crystal display device, and a second area corresponding to rows other than the pixel rows corresponding to the first area. Preferably, the liquid crystal display device includes a liquid crystal panel including a pair of substrates and a liquid crystal layer sealed between the substrates, and a pair of polarizing plates placed on both sides of the liquid crystal panel with transmission axes of the polarizing plates being nearly perpendicular to each other.

In the liquid crystal display apparatus according to the present invention, preferably, the polarization control element is partitioned into a first area corresponding to rows consecutive in a direction in which pixel rows of the liquid crystal display device are sequentially scanned, and a second area corresponding to other rows to be scanned following pixel rows corresponding to the first area, and the driving unit includes a driving circuit which drives the surface light source and the liquid crystal display device to sequentially scan rows corresponding to the first area and rows corresponding to the second area so as to supply image data to pixels on each row, for each frame for displaying a one-frame image, cause the surface light source to apply one of the first and second illumination light in a period during which the image data are supplied to pixels on each row corresponding to the first area, and cause the surface light source to apply the other of the first and second illumination light in a period during which the image data are supplied to pixels on each row corresponding to the second area. In this case, desirably, the polarization control element is partitioned into a first area and a second area by nearly equally dividing the number of pixel rows by two in a direction in which pixel rows of the liquid crystal display device are scanned, and the driving circuit supplies the image data to pixels on each row corresponding to the first area while causing the surface light source to apply one of the first and second illumination light in a first half period of periods obtained by nearly equally dividing one frame by two, and supplies the image data to pixels on each row corresponding to the second area while causing the surface light source to apply the other of the first and second illumination light in a second half period of the one frame.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A surface light source comprising:
    a light source which selectively irradiates two polarized light beams in polarized states different from each other;
    a light guide plate comprising a transparent plate having two plate surfaces facing each other, the light guide plate guiding two light beams selectively irradiated from the light source into the transparent plate upon allowing the light to enter from an end face of the light guide plate, and irradiating the light from an irradiation surface which comprises one of the two plate surfaces; and
    an optical element which irradiates irradiated light from the irradiation surface of the light guide plate in a direction substantially normal to the light guide plate upon changing a propagation direction of the irradiated light;
    wherein the light source comprises:
        a first light-emitting element and a second light-emitting element which are arranged on the end face of the light guide plate so as to face each other;
        a first polarizing element which is provided between the first light-emitting element and the end face of the light guide plate and has a transmission axis in a direction substantially perpendicular to the irradiation surface of the light guide plate; and
        a second polarizing element which is provided between the second light-emitting element and the end face of the light guide plate and has a transmission axis in a direction substantially parallel to the irradiation surface of the light guide plate.

2. The surface light source according to claim 1, wherein the light source comprises a first light source unit including the first light-emitting element and the first polarizing element and a second light source unit including the second light-emitting element and the second polarizing element, said first and second light source units being arranged on the end face of the light guide plate so as to face each other.

3. The surface light source according to claim 2, further comprising a light-shielding plate provided between the first light source unit and the second light source unit which are alternately arranged on the end face of the light guide plate.

4. The surface light source according to claim 1, wherein the light guide plate comprises a reflecting member on a side of the other of the two plate surfaces which faces the irradiation surface.

5. The surface light source according to claim 1, wherein the optical element comprises a prism sheet comprising densely arranged elongated minute prisms extending in a direction substantially parallel to the end face of the light guide plate on which the light source is arranged.

6. A liquid crystal display apparatus comprising:
a surface light source which selectively applies first illumination light comprising first linearly polarized light having a polarization plane in a predetermined direction and second illumination light comprising linearly polarized light having a polarization plane substantially perpendicular to the polarization plane of the first linearly polarized light;
a polarization control element provided on a surface side of the surface light source from which illumination light is irradiated, wherein the polarization control element has an area which corresponds to an illumination light irradiation surface of the surface light source and is partitioned into a first area corresponding to a predetermined range and a second area other than the first area, and rotates a polarization plane of linearly polarized light transmitted through one of the partitioned first and second areas by a predetermined angle;
a liquid crystal display device comprising a polarizing plate which is provided on a light irradiation surface side of the polarization control element so as to correspond to both the first and second areas and which has a transmission axis substantially parallel to a polarization plane of linearly polarized light irradiated to the irradiation surface side upon being transmitted through one of the first and second areas of the polarization control element, wherein the liquid crystal display device comprises a screen area in which pixels which control transmission of light are arrayed in row directions and column directions, and wherein the liquid crystal display device displays, in the screen area, an image corresponding to image data supplied to the pixels; and
a driving unit which, in one frame for display a one-frame image, causes the surface light source to apply one of the first illumination light and the second illumination light in a period during which the image data are supplied to pixels on each row corresponding to the first area of the polarization control element, and causes the surface light source to apply the other of the first illumination light and the second illumination light in a period during which the image data are supplied to pixels on each row corresponding to the second area of the polarization control element.

7. The liquid crystal display apparatus according to claim 6, wherein the surface light source comprises:
a light guide plate comprising a transparent plate having two plate surfaces facing each other, the light guide plate guiding the selectively applied first illumination light and second illumination light into the transparent plate upon allowing the light to enter from an end face of the light guide plate, and irradiating the light from an irradiation surface which comprises one of the two plate surfaces;
a first light-emitting element and a second light-emitting element which are arranged on the end face of the light guide plate so as to face each other and which irradiate the first illumination light and the second illumination light, respectively;
a first polarizing element which is provided between the first light-emitting element and the end face of the light guide plate and has a transmission axis in a direction substantially perpendicular to the irradiation surface of the light guide plate;
a second polarizing element which is provided between the second light-emitting element and the end face of the light guide plate and has a transmission axis in a direction substantially parallel to the irradiation surface of the light guide plate; and
an optical element which irradiates irradiated light from the irradiation surface of the light guide plate in a direction substantially normal to the light guide plate upon changing a propagation direction of the irradiated light.

8. The liquid crystal display apparatus according to claim 7, wherein a first light source unit comprising the first light-emitting element and the first polarizing element and a second light source unit comprising the second light-emitting element and the second polarizing element are arranged on the end face of the light guide plate so as to face each other.

9. The liquid crystal display apparatus according to claim 6, wherein the polarization control element comprises a $\lambda/2$ retardation film which is provided in an area corresponding to one of the first and second areas and rotates a polarization plane of one of the first illumination light and the second illumination light comprising linearly polarized light irradiated from the surface light source.

10. The liquid crystal display apparatus according to claim 9, wherein the $\lambda/2$ retardation film is placed so that a slow axis thereof is in a direction intersecting the polarization planes of the first illumination light and the second illumination light from the surface light source at an angle of substantially 45°.

11. The liquid crystal display apparatus according to claim 6, wherein the polarization control element is partitioned into a first area corresponding to pixel rows of the liquid crystal display device, and a second area corresponding to rows other than the pixel rows corresponding to the first area.

12. The liquid crystal display apparatus according to claim 6, wherein the liquid crystal display device comprises a liquid crystal panel including a pair of substrates and a liquid crystal layer sealed between the substrates, and a pair of polarizing plates provided on both sides of the liquid crystal panel with transmission axes of the polarizing plates being substantially perpendicular to each other.

13. The liquid crystal display apparatus according to claim 6, wherein:
the polarization control element is partitioned into a first area corresponding to rows consecutive in a direction in which pixel rows of the liquid crystal display device are sequentially scanned, and a second area corresponding to other rows to be scanned following pixel rows corresponding to the first area, and
the driving unit comprises a driving circuit which drives the surface light source and the liquid crystal display device to (i) sequentially scan rows corresponding to the first area and rows corresponding to the second area so as to supply image data to pixels on each row, for each frame for displaying a one-frame image, (ii) cause the surface light source to apply one of the first illumination light and the second illumination light in a period during which the image data are supplied to pixels on each row corresponding to the first area, and (iii) cause the surface light source to apply the other of the first illumination light and the second illumination light in a period during which the image data are supplied to pixels on each row corresponding to the second area.

14. The liquid crystal display apparatus according to claim 13, wherein:

the polarization control element is partitioned into a first area and a second area by substantially equally dividing the number of pixel rows by two in a direction in which pixel rows of the liquid crystal display device are scanned, and the driving circuit supplies the image data to pixels on each row corresponding to the first area while causing the surface light source to apply one of the first illumination light and the second illumination light in a first half period of periods obtained by substantially equally dividing one frame by two, and supplies the image data to pixels on each row corresponding to the second area while causing the surface light source to apply the other of the first illumination light and the second illumination light in a second half period of the one frame.

* * * * *